(12) United States Patent
Khachadourian et al.

(10) Patent No.: US 6,412,153 B1
(45) Date of Patent: Jul. 2, 2002

(54) DEVICE FOR ATTACHING AT LEAST TWO PIECES OF MATERIAL

(75) Inventors: Vatche D. Khachadourian, Creedmoor; Mark E. Maresh, Wake Forest; Duncan Andrew Whalen, Durham, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/645,111

(22) Filed: Aug. 23, 2000

(51) Int. Cl.[7] ............................................... A44B 17/00
(52) U.S. Cl. ............................. 24/614; 24/618; 24/625; 24/662
(58) Field of Search ........................... 24/614, 625, 666, 24/618, 604, 662, 683; 450/36

(56) References Cited

U.S. PATENT DOCUMENTS

| | | | | |
|---|---|---|---|---|
| 809,351 A | * | 1/1906 | Wotzel | 24/662 |
| 936,148 A | * | 10/1909 | McConnell et al. | 24/662 |
| 1,325,577 A | * | 12/1919 | Pilkington | 24/662 |
| 1,555,764 A | * | 9/1925 | Slote | 24/618 |
| 2,895,199 A | * | 7/1959 | Jones | 24/618 |
| 2,946,612 A | * | 7/1960 | Ahlgren | 24/662 |
| 3,416,200 A | * | 12/1968 | Daddona, Jr. | 24/625 |
| 3,890,680 A | * | 6/1975 | Furuya | 24/614 |
| 5,103,538 A | * | 4/1992 | Ryder | 24/662 |
| 5,412,848 A | * | 5/1995 | Precourt, Jr. | 24/662 |
| 5,511,432 A | * | 4/1996 | Holmes | 73/856 |

* cited by examiner

*Primary Examiner*—Victor Sakran
(74) *Attorney, Agent, or Firm*—Joseph A. Sawyer, Jr.

(57) ABSTRACT

A device for attaching at least two pieces of a material is disclosed. The device comprises a first portion, the first portion comprising an opening and a ledge therein and a latching mechanism hingedly coupled to the first portion wherein the latching mechanism is capable of being attachably coupled to the first portion via the ledge. Accordingly, the device in accordance with the present invention is easy to open and close, latches securely, and stays closed during package stress testing.

12 Claims, 6 Drawing Sheets

DEVICE FOR ATTACHING AT LEAST TWO PIECES OF MATERIAL

FIELD OF THE INVENTION

The present invention relates generally to the coupling together of packaging material and particularly to a device for attaching at least two pieces of material.

BACKGROUND OF THE INVENTION

The function of a closure clip is to hold two pieces of material together by inserting the clip into die cut holes in each piece of the material. However, conventional closure clips have several drawbacks. Some of the conventional clips are difficult to close while others are difficult to open. Some of the conventional clips do not stay closed when subjected to package drop testing while other conventional clips break during drop testing due to insufficient tensile strength. It is also difficult to make sure that the conventional clip is positively latched. This is a crucial defect because if the clip is not positively latched, it could inadvertently open during product shipment.

Accordingly, what is needed is a device that overcomes the many drawbacks of conventional closure clips. The device should be simple, inexpensive, and capable of being adapted to existing technology. The present invention addresses such a need.

SUMMARY OF THE INVENTION

A device for attaching at least two pieces of a material is disclosed. The device comprises a first portion, the first portion comprising an opening and a ledge therein and a latching mechanism hingedly coupled to the first portion wherein the latching mechanism is capable of being attachably coupled to the first portion via the ledge.

Accordingly, the device in accordance with the present invention is easy to open and close, latches securely, and stays closed during package stress testing.

DETAILED DESCRIPTION

The present invention relates to a device for attaching at least two pieces of a material. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention is presented in the context of a preferred embodiment. The preferred embodiment of the present invention is a device for holding at least two pieces of material together. Preferably, the material comprises a corrugated fiberboard material. A device in accordance with the present invention is easy to open and close, latches securely, and stays closed during package stress testing.

Although the preferred embodiment of the present invention is described in the context of being used in conjunction with a corrugated fiberboard material, one of ordinary skill in the art will readily recognize that a variety of materials could be utilized while remaining within the spirit and scope of the present invention.

Figure 1:
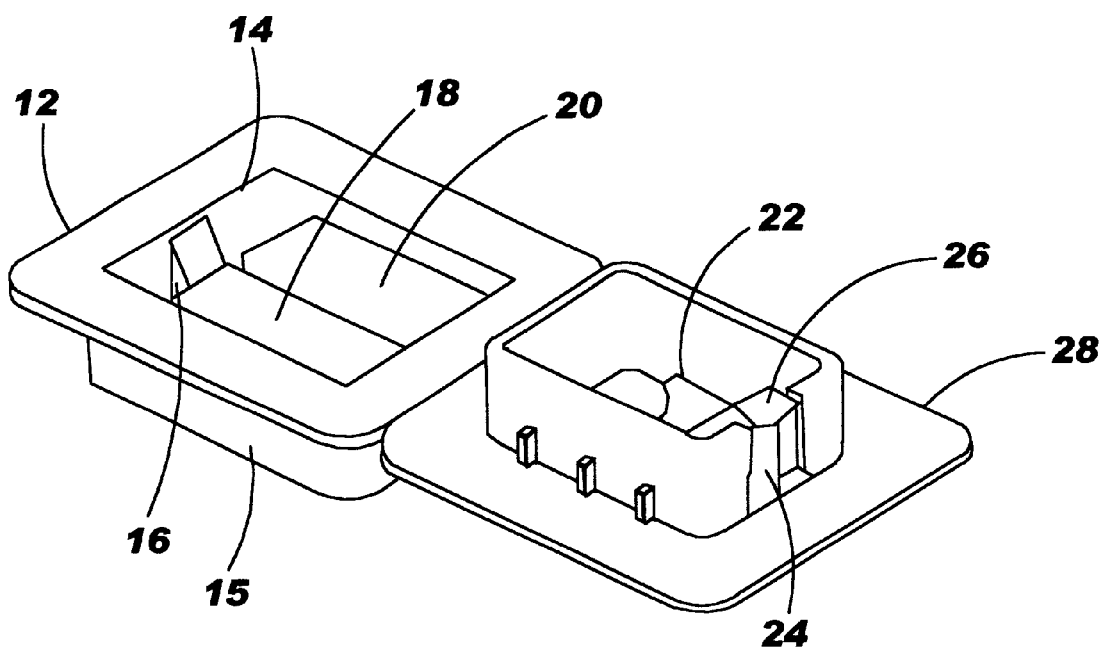
FIG. 1 is an illustration of the device in accordance with the present invention.

For a better understanding of the device in accordance with the present invention, please refer now to FIG. 1. FIG. 1 is an illustration of the device in accordance with the present invention. The device 10 comprises a bottom portion 12 and a top portion 28. The bottom portion 12 includes an opening 14 for receiving the top portion 28, a lower perimeter 15, and a ledge 16. The bottom portion 12 also includes two legs 18, 20 that are hingedly coupled to the base of the bottom portion 12. The top portion 28 includes a latching mechanism 24. The latching mechanism 24 comprises a latch 26 and a release tab 22. Preferably the device 10 is made of a plastic type material however one of ordinary skill in the art will readily recognize that a variety of materials could be utilized while remaining within the spirit and scope of the present invention.

Figure 2:
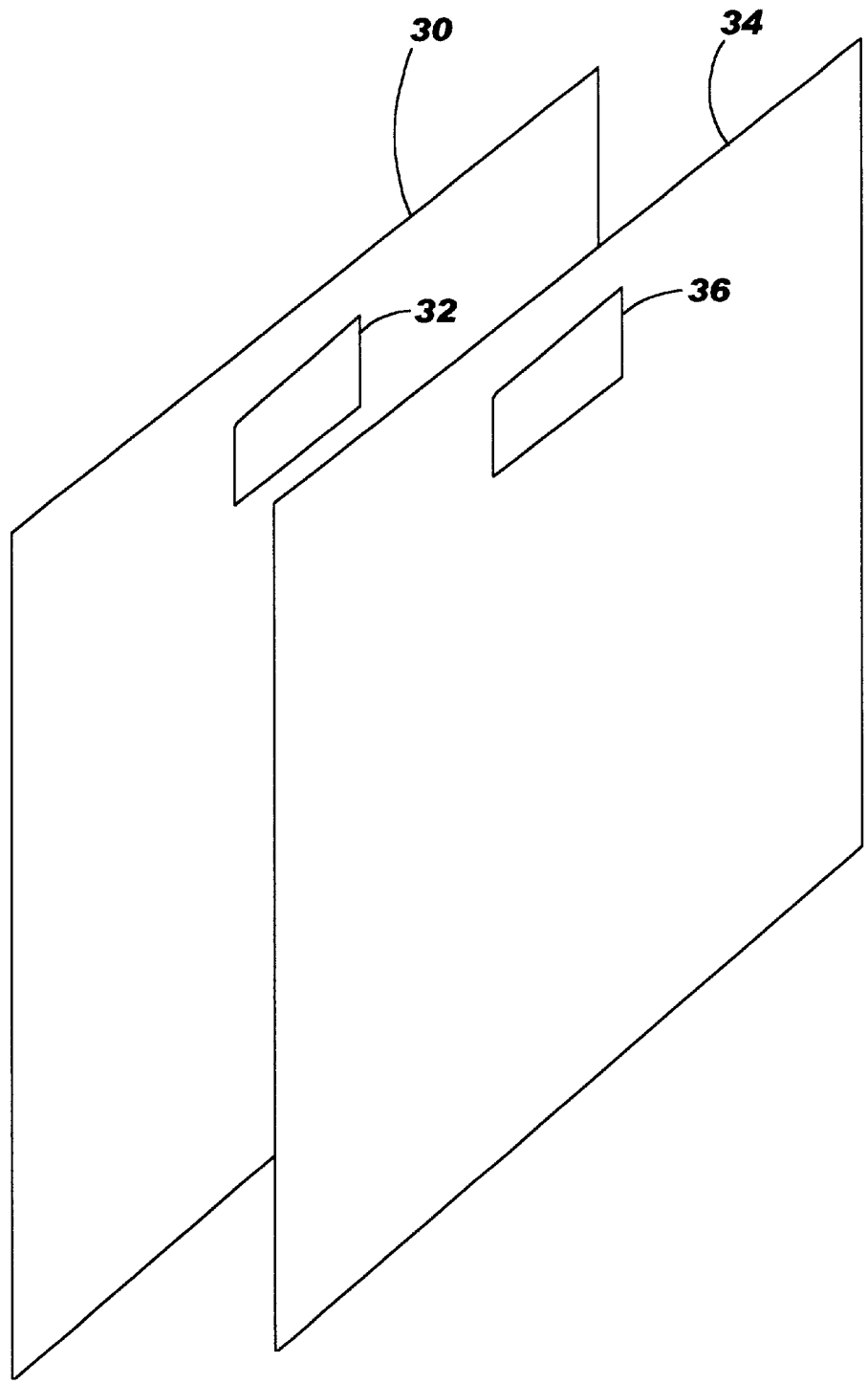
FIG. 2 shows two pieces of corrugated fiberboard.
Figure 3:
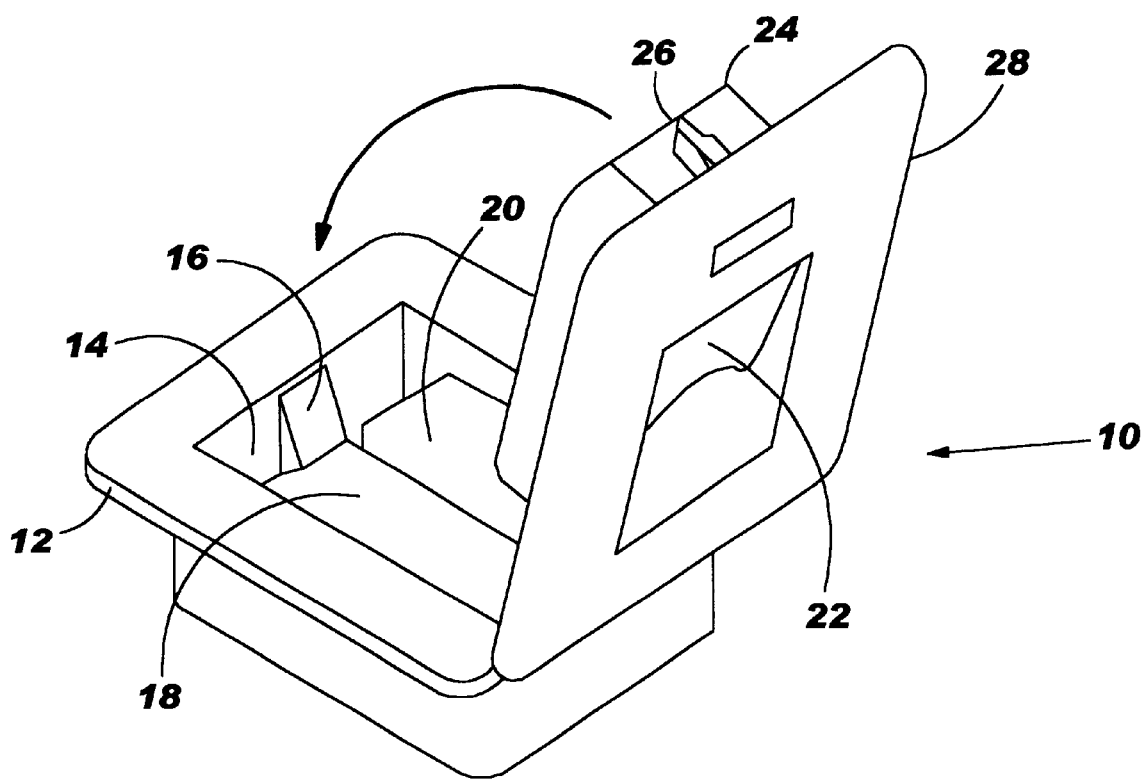
FIG. 3 shows the hinged rotation of the device in accordance with the present invention.

The device 10 in accordance with the present invention preferably functions as an attachment clip for holding at least two pieces of corrugated fiberboard together. In order to clip the at least two pieces of material together, die holes, roughly the size of the lower perimeter 15 of the bottom portion 12, are cut into the two pieces of material. FIG. 2 shows two pieces of corrugated fiberboard 30, 34 comprising die holes 32, 36. The bottom portion 12 of the device 10 is then placed into the holes 32, 36. The top portion 28 of the device 10 is then hingedly rotated to close down into the opening 14 of the bottom portion 12. FIG. 3 shows the hinged rotation of the device 10 in accordance with the present invention.

Figure 4:
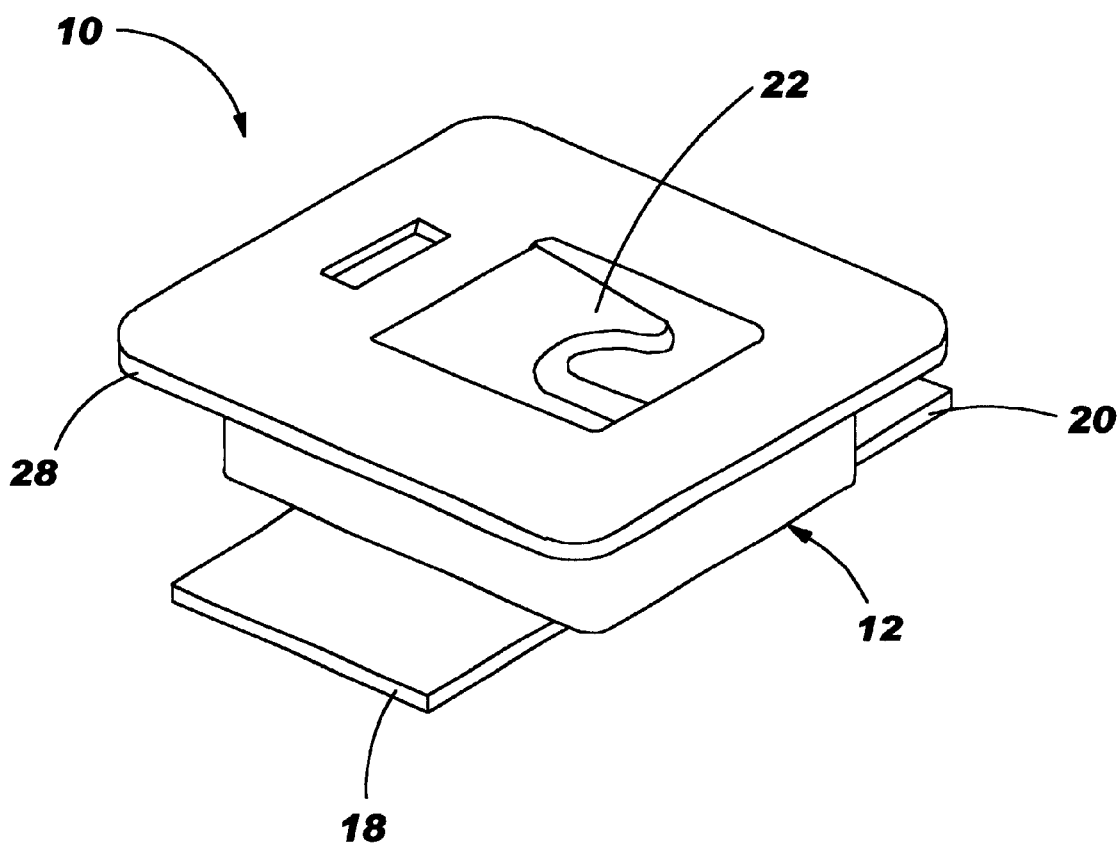
FIG. 4 shows the closed device in accordance with the present invention wherein the legs are extending from the bottom portion in a perpendicular fashion.

As the device 10 closes the two legs 18, 20 hingedly rotate approximately 90 degrees and extend from the bottom portion 12 in a perpendicular fashion. FIG. 4 shows the closed device 10 in accordance with the present invention wherein the legs 18, 20 are extending from the bottom portion 12 in a perpendicular fashion. Since the span of the extended legs 18, 20 are now larger than the die cut holes in the corrugated material, the material is securely attached and won't come apart.

Figure 5:
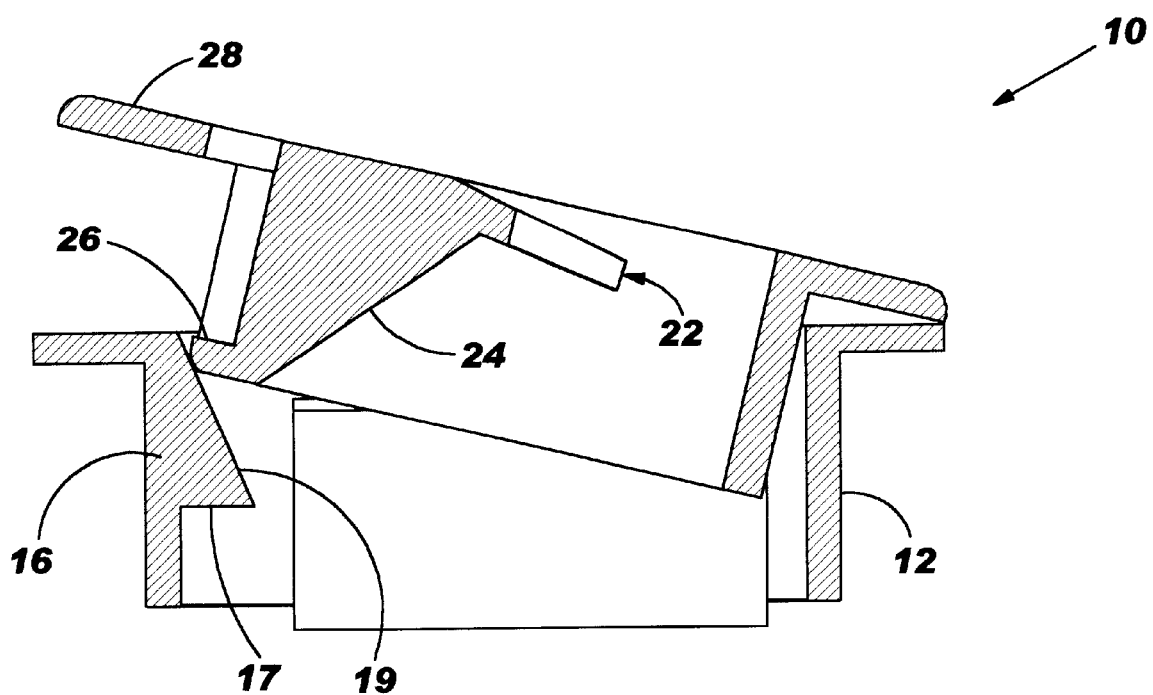
FIG. 5 is an illustration of a side perspective view of the device in accordance with the present invention.

Please refer now to FIG. 5. FIG. 5 is a side perspective view of the device 10 in accordance with the present invention. The device 10 achieves an advantage over conventional clips through the unique design of the latching mechanism 24. As previously mentioned, the latching mechanism comprises of two parts: the latch 26 and the release tab 22. The latch 26 is designed so that it slides under a flat portion 17 of the ledge 16 as the top portion 28 of the device 10 is pushed down into the opening 14. A sloped portion 19 of the ledge 16 puts pressure on the latch 26 which causes the latch 26 to push with increasing force against the ledge 16 as the clip is being closed.

Figure 6:
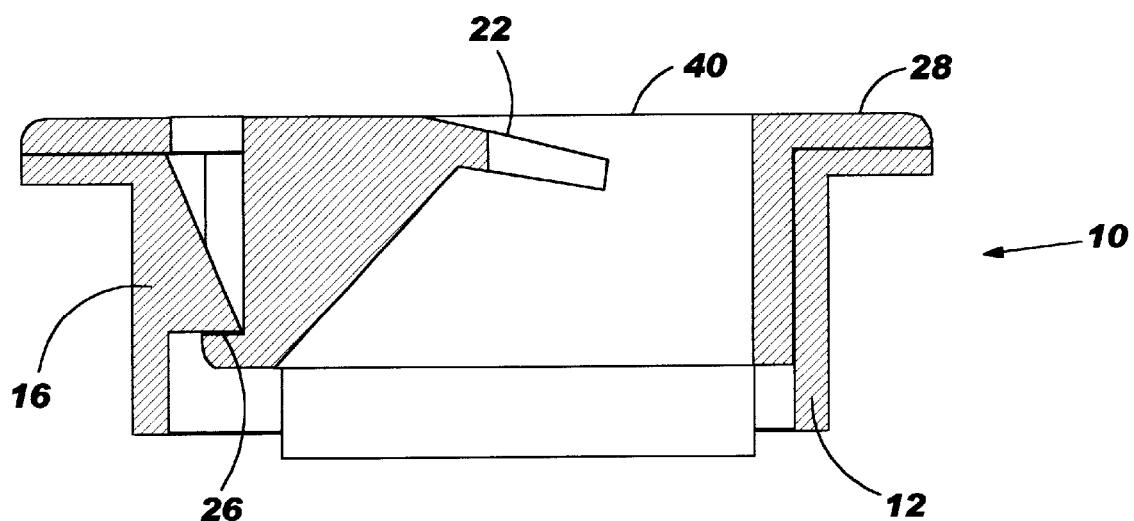
FIG. 6 is a side perspective view of the device in accordance with the present invention when it is completely closed.

When the device 10 is completely closed, the latch 26 slides under the flat portion 17 of the ledge 16. For an illustration of the closed device 10, please refer now to FIG. 6. FIG. 6 is a side perspective view of the device 10 in accordance with the present invention when it is completely closed. When the latch 26 slides completely under the ledge 16, the pressure being placed on the latch 26 via the ledge 16 is released. The release of pressure causes the device 10 to snap shut with a distinctive sound. The sound is an indicator that the device 10 is securely closed.

Once the device 10 is closed, the only way to open the device 10 is to pull back on the release tab 22. This causes the latch 26 to slide back across the ledge 16, thereby allowing the top portion 28 of the device 10 to be removed from the opening 14 of the bottom portion 12. Preferably, the release tab 22 is designed so that it is inset below the top plane 40 of the closed device 10 so it doesn't catch on objects and possibly open during shipment.

Through the use of the latching mechanism, the device in accordance with the present invention is easy to open and close, latches securely, and stays closed during package stress testing.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A device for attaching at least two pieces of material, comprising:

a first portion, the first portion comprising an opening and a ledge therein;

at least one leg hingedly coupled to the first portion; and a latching mechanism hingedly coupled to the first portion wherein the latching mechanism comprises a latch and is capable of being attachably coupled to the first portion via the ledge wherein the at least one leg hingedly rotates approximately 180 degrees when the latching mechanism is attachably coupled to the first portion.

2. The device of claim 1 wherein the latching mechanism further comprises a latch.

3. The device of claim 2 wherein the release tab is capable of being utilized to detach the latching mechanism from the first portion.

4. The device of claim 1 wherein the latch is capable of being attachably coupled to the ledge.

5. The device of claim 1 wherein the material comprises a corrugated fiberboard material.

6. A device for attaching at least two pieces of material, wherein each of the at least two pieces of material comprise a hole for receiving the device, the device comprising:

a first portion, the first portion comprising an opening and a ledge therein;

a latching mechanism hingedly coupled to the first portion wherein the latching mechanism further comprises a latch and a release tab, wherein the latch is capable of attachably coupling the latching mechanism to the first portion via the ledge and the depression of the release tab detaches the latching mechanism from the first portion; and at least one leg hingedly coupled to the first portion wherein the at least one leg hingedly rotates when the latching mechanism is attachably coupled to the first portion.

7. The device of claim 6 wherein the latch is capable of being attachably coupled to the ledge.

8. The device of claim 6 wherein the at least one leg hingedly rotates approximately 90 degrees.

9. The device of claim 6 wherein the material comprises a corrugated fiberboard material.

10. A device for attaching at least two pieces of corrugated fiberboard material, wherein each of the at least two pieces of corrugated fiberboard material comprise a hole for receiving the device, the device comprising:

a first portion, the first portion comprising an opening, a ledge, and at least one hingedly coupled leg; and a latching mechanism hingedly coupled to the first portion wherein the latching mechanism comprises:

a latch; and a release tab, wherein the latch is capable of being attachably coupled to the first portion via the ledge wherein the at least one leg hingedly rotates approximately 90 degrees when the latching mechanism is attachably coupled to the first portion.

11. The device of claim 10 wherein the release tab is capable of being utilized to detach the latching mechanism from the first portion.

12. A corrugated fiberboard closure clip for attaching at least two pieces of corrugated fiberboard material, wherein each of the at least two pieces of corrugated fiberboard material comprise a hole for receiving the device, the device comprising:

a first portion, the first portion comprising an opening, a ledge, and two hingedly coupled legs; and a latching mechanism hingedly coupled to the first portion wherein the latching mechanism comprises:

a latch; and a release tab, wherein the latch is capable of being attachably coupled to the first portion via the ledge wherein the at least one leg hingedly rotates approximately 90 degrees when the latching mechanism is attachably coupled to the first portion and the release tab is capable of being utilized to detach the latching mechanism from the first portion.

* * * * *